Patented Aug. 14, 1934

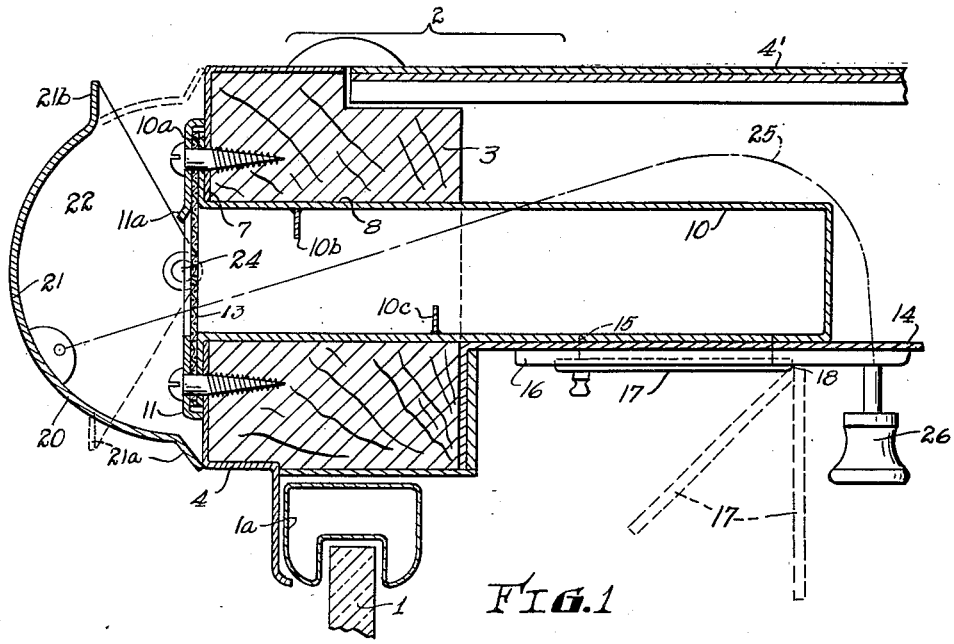

1,969,935

UNITED STATES PATENT OFFICE 1,969,935

VEHICLE BODY VENTILATOR AND METHOD

William Lintern and Alfred R. Lintern, Cleveland, Ohio

Application December 3, 1931, Serial No. 578,712

4 Claims. (Cl. 98—2)

This invention relates to certain improvements and adaptations of a ventilating and/or cooling system, method and apparatus disclosed in the application of Wm. Lintern Ser. No. 547,938, filed June 30, 1931.

The present improvements are concerned principally with simple and effective devices for incorporating the principles set forth in said application and additional principles adapted to automobile body constructions of current types, principally to secure adequate ventilation either by taking air into the body or the desired parts to be ventilated, cooled or aerated, as well as affording practically adequate ventilation by ejecting air from the body.

The general object may be stated to be to provide a more efficient all-weather ventilator, and further, one which will not appreciably change the so-called "design lines" of cars equipped therewith.

A further object is to provide a simple device which will be efficient in carrying out its functions, which will be weather proof, and which may be applied to current types of vehicle bodies (pleasure cars, busses and trucks, e. g.) without having to alter either the body construction or the design lines thereof materially.

Other objects and features of the invention will become apparent from the following description relating to the accompanying drawings, wherein we have shown our preferred forms. The essential characteristics are summarized in the claims.

Figure 3:
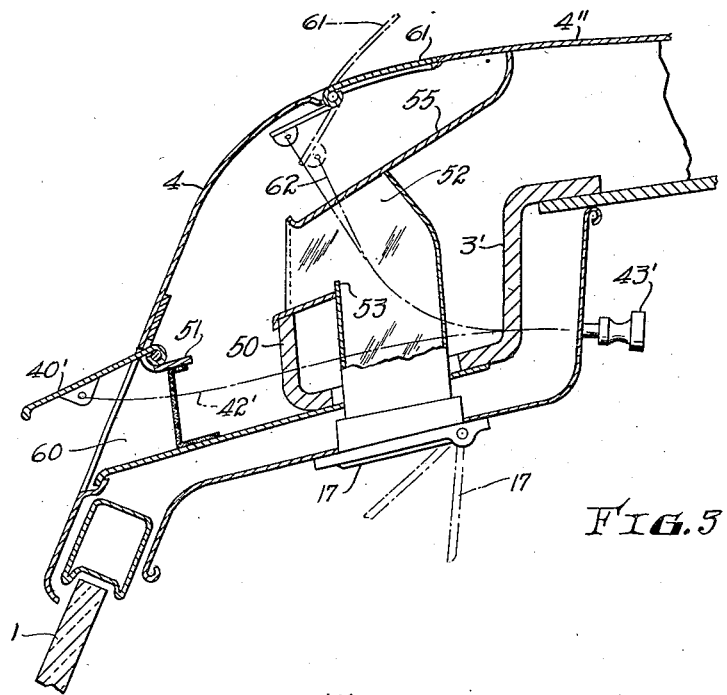
Figure 4:
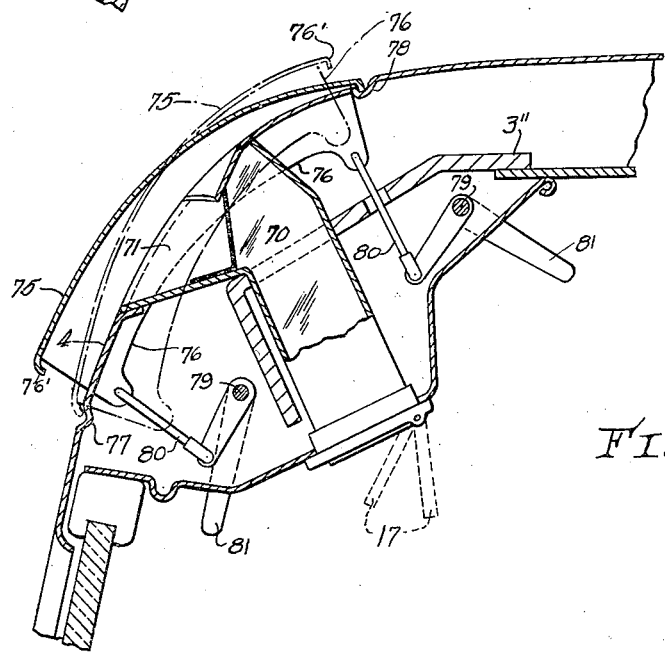

In the drawings, Fig. 1 shows one application of the principles here involved (principally for trucks and busses), the view being a longitudinal cross sectional view through the forward portion of the roof structure and the upper portion of a suitable windshield; Fig. 2 is a similar fragmentary cross sectional view of another form (better adapted for pleasure cars), and Figs. 3 and 4 are similar cross sectional views of still other forms principally adapted with relation to the so-called all steel body structures.

The subject matter of this application differs from the subject matter of the above identified Lintern application and certain copending applications of William and Alfred R. Lintern, filed concurrently herewith (Ser. No. 578,710 and Ser. No. 578,711) as follows:

In this application, external adjustable louvers or deflectors are arranged with reference to the normal air stream passing upwardly and/or rearwardly over the body and the arrangements hereof are all characterized by provision for both air injection and air ejection with relation to the body or whatever part of the vehicle it is desired to aerate, cool or ventilate.

Referring first to Fig. 1, the character 1 designates the upper portion of a suitable windshield having a frame 1a, and 2 indicates the forward portion of the roof structure. The roof structure includes a suitable rigid header member 3 which usually extends entirely across the roof portion of the body and forms the main front brace for the top structure. The header and the general top as shown, is provided with a suitable protective cover which may comprise sheet metal members 4 extending about the general forward surface of the header and close thereto. Suitable cover material is continued at 4' over the top of the roof generally and such cover continuation may comprise sheet metal, fabric or any other suitable protective material. As shown in Fig. 1, the cover has an opening therethrough at 7, and the header an opening at 8 in alignment therewith through which extends a suitable tube 10, the tube, as shown, being flanged at its forward end as at 10a to lie directly against the cover member 4, being secured in place by a suitable finishing plate 11, also perforated, and provided with a slight water shed formation 11a. A suitable perforated guard, such as a metal screen 13, is interposed between the cover plate 11 and flange 10a extending over the general opening, permitting free entrance and exit of air but guarding the opening against the entrance of foreign matters, water, dust, bugs, snow and the like. The tube extends inwardly within the top structure between the roof and the inside cover panelling 14, and has an opening at 15 leading into the interior of the body. The opening 15 which leads through the inner panelling is provided, as shown, with a suitable finishing plate 16 on which is mounted a suitable deflector and closure member 17. This may be hinged for example as at 18 to the plate 16 and when in position adjacent the plate entirely cuts off passage of air between the tube and body interior. A suitable detent means (not shown) may be provided on the member 17 to hold it in various positions, to receive or deflect air most effectively.

If the opening in the front end of the tube were left entirely open, air would rush in the front end of the tube 10 at all times when the vehicle is moved forwardly and this air could be deflected in various ways into the body interior. I have provided, however, means for regulating the effect of the forwardly facing opening as follows: In front of the plate 11 and overlying the open front end of the tube is a deflector member 20, the deflector member having a curved main front wall 21 and side walls 22, the upper and lower edge of the front wall 21 being flanged as at 21a and 21b to close against the front end structure of the top. The deflector is pivoted on suitable pintles 24 to suitable brackets (not shown), but which may be supported by and if desired form a part of the cover plate 11.

The deflector is swingable on its pivot to two positions, namely, that shown in full lines and that shown in broken lines, and a suitable controlling arrangement for the deflector may comprise a flexible control wire or rod 25 provided, within reach of the driver, with a suitable adjusting button 26. When the deflector is in the position shown in full lines and the vehicle is in motion, air rushing upwardly over the windshield is guided by the front wall 21 of the deflector so that it rises abruptly as it passes over the top flange 21b, causing sub-normal air pressure above the deflector, and the forward portion of the roof structure. This causes rapid withdrawal of air from the body through the tube 10. If, on the other hand, the deflector is adjusted to the position indicated in broken lines, then a portion of the air stream passing upwardly over the windshield is scooped in by the lower flange 21a of the deflector and the air is directed into the tube by the then closed upper wall portions of the deflector, and thence into the body in any suitable way, as by the deflector-shutter 17. When using the apparatus to inject air into the car as just stated, it is preferable to direct the air forwardly and downwardly as by a position of the deflector-shutter 17 intermediate the full-open and full-closed positions indicated.

The air so received in the body passes forcibly down over the windshield and into the cowl space, thus very effectively aerating and cooling the portion of the body which, as is well known, is the most difficult space to maintain at comfortable temperatures. When in its full open position, the shutter 17 also directs the air downwardly parallel to the windshield and, under most conditions, the air is then directed to the bottom of the body in the cowl space, but more of the air of course flows immediately over the entire body and face of the driver or passenger occupying the front seat of the body. Incidentally, any other shutter or deflector arrangement suggested in the copending cases filed herewith may also be used at the opening 15.

We have found that by the provision of suitable baffles, the arrangement may be made substantially weather-proof, even in heavy rains and adjusted to act as an air injector. A suitable arrangement of baffles is shown in Fig. 1, and comprises a depending baffle member 10b and an upwardly rising baffle member 10c. The action of the baffle 10b in conjunction with the generally rounded shape of the deflector is to cause the incoming air to take a swirling path, thus by centrifugal force wringing the air dry of the larger suspended particles of moisture, deflecting the same against the tube walls, particularly the bottom wall of the tube forwardly of the baffle 10c from which such moisture drains out forwardly.

Referring now particularly to Fig. 2, this shows an arrangement which does not interfere at all with the body lines but which follows in general the principles illustrated in Fig. 1. So much only of this arrangement as is essentially different will be described in detail.

The header construction, as before, comprises a suitably heavy transverse member 3, say of wood, provided with a protective covering of sheet metal at 4 continued over the top of the body as at 4' (as a separate piece, as shown). The header supports a tube 30 in an opening 31 therein and the tube is provided with two adjustable shutters 17 supported as by a convenient cover plate 16 as before.

The tube at its forward end is somewhat widened, providing a moisture precipitating air swirling space and further to admit of the provision of individual forwardly positioned deflectors for air injection and ejection respectively. As shown, there is an injector deflector at 40 having a suitable hinge arrangement at its upper edge, indicated at 41, and there is a control rod or wire at 42 with a suitable button 43 inside the car body by which the deflector may be swung from its open position, as shown in full lines, into closed position against the cover 4, the latter position obstructing a portion of the opening leading into the tube. When the deflector 40 is opened, air is scooped from the air stream, assuming the vehicle is in motion, and is thrown upwardly by the upwardly inclined surfaces 30a and a suitable baffle 30b, throwing the moisture (if any) against the tube walls to drain out at the front opening. Additional weather protection is afforded by baffles 30d and 30c, the former being notched at intervals to provide free drainage from the surface 30c. The air ejection operation comprises swinging an upper deflector 45 forwardly, into the broken line position thereof shown, about a suitable hinge, also at 41, as by a suitable rod 46 and button (not shown).

Referring now to Fig. 3, this adaptation differs from those previously described, principally in that the air duct is modified to lead the air out of a top opening or openings in the roof structure, the intake opening and deflector arrangement therefor being very similar to that shown in Fig. 2, namely, comprising a hinged deflector 40', control rod or wire 42' and button 43'. The tube arrangement includes a substantially vertical wall 50 (part of the header 3', as shown) opposite the screened opening 60. The opening 60 may be overhung by a slight flange 51 to better direct the incoming air toward the vertical wall 50 and cause it to be swirled upwardly (to precipitate moisture) before entering the main tube channel 52. As shown, the forward end of the tube is directed forwardly and downwardly and is provided with a baffle at 53 adjacent the downwardly directed duct portion of the tube which leads into the body through the roof structure. The tube, as shown, passes through the header 3'. The shutter arrangement 17 may be substantially as in the previously described arrangements or modified in accordance with other arrangements herein shown.

Above a downwardly and forwardly inclined top wall member 55 of the tube or channel arrangement are positioned a suitable number of adjustable louver deflectors 61, these also being controllable as by suitable flexible rods or wires 62 and a button or buttons opposite the button 43' (not shown). The louvers when closed lie in suitable depressions in the top cover member 4" of the body, continuing from the general cover 4, in order that the louvers will be completely concealed from view when in closed position. When in their open position, as shown, the air stream is deflected in part by the louvers to cause or favor withdrawal of air through the tube arrangement in the same manner as previously described. The louvers afford an excellent protection against weather when the car is standing still, although it is apparent that no water will enter the body even though the louvers are left open. It has been found that deflectors of the proportions indicated at 61 in Fig. 3 do not in the location shown assist materially in ejecting air through the ejector opening or passage because of the fact that in open position such deflector as illustrated is in the normal low pressure area created by deflection of air upwardly from the windshield and front wall over the roof. Such a deflector as shown might, however, render some assistance in ejecting air at low vehicle speeds.

Referring now to Fig. 4, this is very much on the order of the arrangement shown in Fig. 1, except that the deflector is arranged to form a complete closure for the opening or openings into the vehicle body in one of the adjustments of the deflector. The tube 70, as shown, leads rearwardly and then downwardly from the opening 71 in the outer roof cover member 4. The tube may pass through the steel header 3″, as indicated. The adjustable closure and deflector 17 for the inner end of the tube may be in accordance with any of the arrangements previously described. The adjustable deflector by which with the single opening in the tube, air injection and ejection may be afforded selectively, comprises a sheet metal member 75 with flanges 76 at its side edges (one only being shown), arranged to extend into suitable elongated slots in the roof cover member 4, which slots the flanges may slidably fit. Heavy fabric or felt may be used as a packing to prevent leakage. The deflector substantially follows the curves of the cover member 4 so as not to interfere materially with the body lines and adjustment is provided by which the deflector may be rocked into two operating positions: injecting and ejecting, about its upper and lower ends respectively, as pivots. A third position (not shown) is with the deflector drawn down closely embracing the end of the roof, the slightly flanged ends 76 entering registering depressions 77 and 78 in the cover member 4.

A suitable rock shaft arrangement (see shafts 79—suitably supported—, linkage 80 and operating levers 81) may be used to swing the deflector to its three positions, acting on the inwardly extending flanges 76.

We claim:

1. A vehicle body and ventilator, comprising a roof structure and forwardly facing wall adjacent thereto, an opening in the upper portion of said forwardly facing wall communicating with the interior of the body, and adjustable deflector means positioned over said opening arranged to direct the air stream passing over the body into the opening when in one position, for air injection, and away from the opening in another position, for exhausting air from the body.

2. In a vehicle body having a top wall and a forwardly facing body wall portion joining the top wall, an opening in the forwardly facing wall at the upper portion thereof, means communicating the opening with the interior of the body, and a deflector plate extending upwardly in superposed relation to the opening, said deflector plate being adjustably mounted on one of said walls and arranged to be tilted and to dispose its lower edge in contact with the underlying body wall surface and its upper edge in spaced relation to the underlying body wall surface and to form with the underlying external body wall surfaces an ejector duct extraneously of the body and communicating with the opening for ejecting air therefrom when said plate is in one position of adjustment, and to dispose the said edges of the plate in a reverse manner whereby the plate forms with said external body wall surfaces an injector duct extraneously of the body and adapted to inject air into the opening when the plate is in another position of adjustment.

3. Apparatus according to the next preceding claim wherein said plate overlies both the upwardly and rearwardly extending external body wall surfaces and substantially conforms thereto, and there are means to position the plate closely against said surfaces substantially flush therewith thereby closing the opening.

4. In a vehicle body having a front wall and top wall, an opening in the front wall close to the top wall, means to communicate the opening with the interior of the body, a shaft extending horizontally across the opening intermediately of the upper and lower limits thereof, deflector plates pivoted on said shaft and each arranged to close respective upper and lower portions of the opening and lie substantially flush with the front wall surfaces adjacent the opening and means to control the position of said deflector plates to inject and eject air into and from the body through the said opening.

WILLIAM LINTERN.
ALFRED R. LINTERN.